Figure 1:
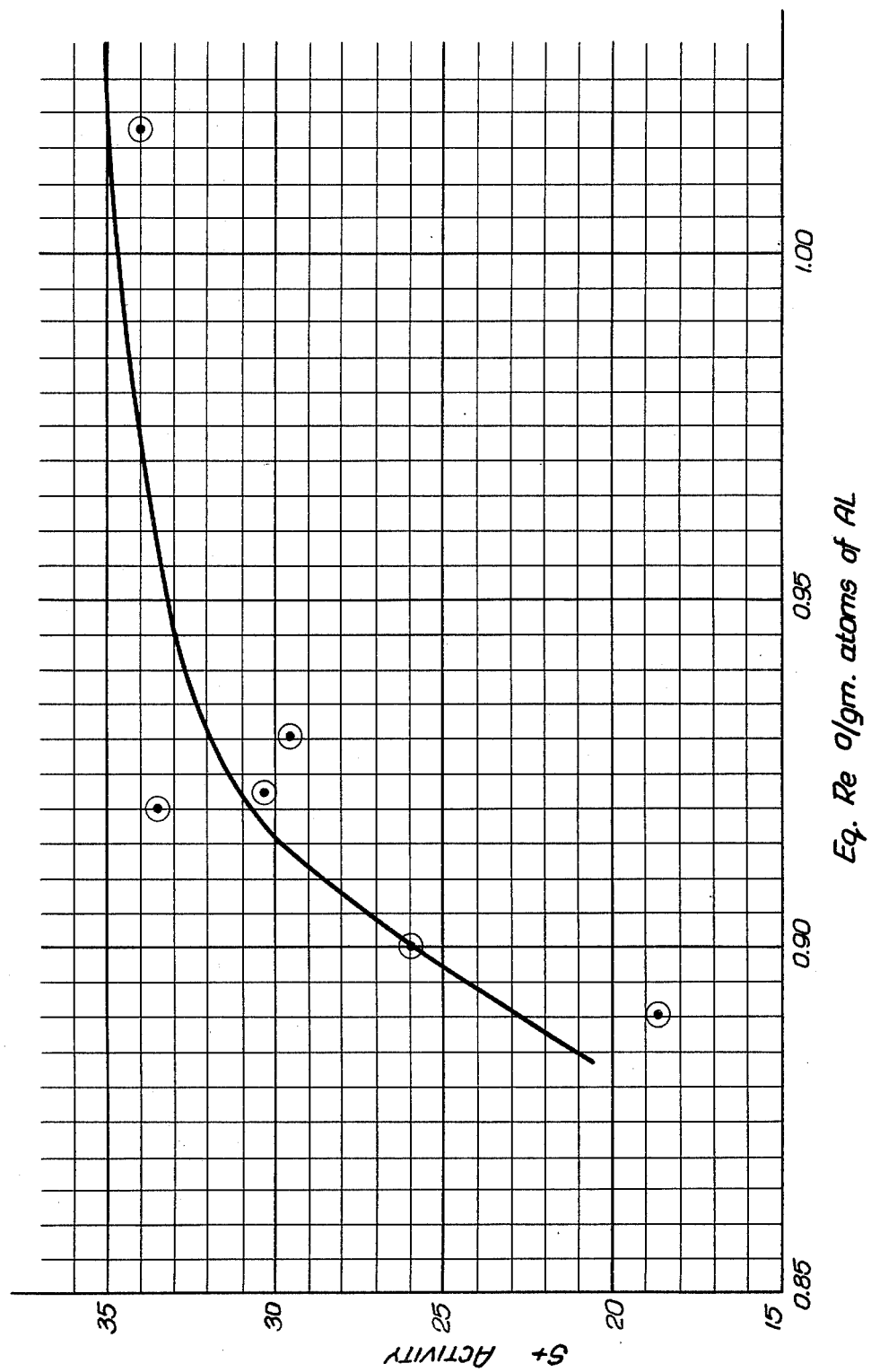

United States Patent [19]

Alafandi et al.

[11] 4,164,483
[45] Aug. 14, 1979

[54] RARE EARTH EXCHANGE X ZEOLITES, CATALYST EMPLOYING THE SAME AND METHOD FOR PRODUCING THE SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 808,268

[22] Filed: Jun. 20, 1977

Related U.S. Application Data

[63] Continuation-in-part of Ser. No. 718,167, Sep. 9, 1976, Pat. No. 4,058,484.

[51] Int. Cl.² .............................................. B01J 29/06
[52] U.S. Cl. ................................. 252/455 Z; 423/112
[58] Field of Search .................... 252/455 Z; 423/112, 423/118

[56] References Cited

U.S. PATENT DOCUMENTS

| 3,173,854 | 3/1965 | Eastwood et al. | 252/455 Z |
| 3,537,816 | 11/1970 | Moscow | 423/112 |
| 3,867,307 | 2/1975 | Scherzer et al. | 252/455 Z |

Primary Examiner—Carl Dees
Attorney, Agent, or Firm—Philip Subkow; Bernard Kriegel

[57] ABSTRACT

This invention relates to the preparation of rare earth exchanged X type faujasite zeolites in which the Na content is reduced by exchange with rare earth cations to introduce in excess of about 0.9 equivalents of rare earth cations per gram atom of aluminum and catalysts employing the same.

9 Claims, 1 Drawing Figure

RARE EARTH EXCHANGE X ZEOLITES, CATALYST EMPLOYING THE SAME AND METHOD FOR PRODUCING THE SAME

CROSS REFERENCE TO RELATED APPLICATION

This application is a continuation-in-part of my pending application, Ser. No. 718,167 filed Sept. 9, 1976 U.S. Pat. No. 4,058,484, for Ammonium Faujasite Zeolites.

BACKGROUND OF THE INVENTION

It is generally recognized in this art that hydrothermal stability of the faujasite zeolites increases with increase in the $SiO_2/Al_2O_3$ ratio. Thus the Y zeolites (See Breck U.S. Pat. No. 3,130,007) when incorporated in a matrix in catalytic cracking operations give higher conversions than similar catalysts produced from the X type faujasite zeolites. (See Milton U.S. Pat. No. 2,882,244 and Plank et al. U.S. Pat. Nos. 3,140,249 and 3,140,253).

It is a well known historical fact that when the Y zeolites became available the industry abandoned the X type as a catalyst precursor in favor of catalysts based on the Y zeolites.

Generally speaking the catalysts available to the industry prior to the introduction of the Y zeolites were based on a zeolite having a faujasite x-ray pattern of a faujasite zeolite of $SiO_2/Al_2O_3$ ratio much below 3 which had been exchanged with monovalent cations such as hydrogen or ammonium $NH_4$ or polyvalent cations such as rare earth or rare earth and magnesium cations. These were incorporated in matrixes which included clays, hydrated alumina, silica sols and silica gels and silica-alumina gels.

Catalytic activity of such catalysts are reported in terms of activity as measured by a test procedure which has been widely accepted. It is of the type reported in the Oil and Gas Journal issues of 1966, Volume 64, Number 39, Pages 84, 85 as modified as reported in the issue of Nov. 22, 1971, Pages 60–63. In the following examples the conditions were as follows. The calcined catalyst was first steamed at temperatures and times specified below and then used in cracking of a petroleum fraction under the following conditions. Oil charge was a wide boiling range high sulfur feed stock (boiling range about 430° to 1000° F.). The catalyst to oil ratio equals 2.92. The weight hourly space velocity equals 16.45 grams of oil per gram of catalyst per hour. The temperature of the reactor is 910°. The percent conversion is reported as the volume of liquid condensate product of boiling point range of up to 421° F. based on the volume of liquid charge. The percent conversion after calcined in air three hours at 1050° F. and steamed for two hours at 1450° F. is termed M activity. When the calcined sample is steamed at 1500° F. for two hours, it is termed the S activity. When the calcined sample is first steamed for two hours at 1550° F., it is termed S+ activity.

Prior art commercial catalyst formed from Y zeolites which had an Na content expressed as $Na_2O$ based upon the volatile free zeolite of the order about 3 to 4% produced by exchanging with acid or ammonium or with rare earth or with rare earth and magnesium ions or with calcium ions and incorporated in a matrix composed of alumina and clay had characteristic M activities ranging from about 65 to about 80 for concentrations of the zeolite ranging from about 10% to 25% based upon the catalyst. The S+ activity of such catalysts were about 20% which is also substantially the S+ activity of the matrix. These values are not to be taken as characteristic of all prior art catalysts, but of the type which have been designated as B type catalysts. (See our copending Application, Ser. No. 782,971).

The need for catalysts of greater thermal and hydrothermal stability lead to the development of what has become known in this art as "ultra stable" catalyst. These catalysts employ Y zeolites which have been exchanged to reduce the $Na_2O$ value to under 1%.

The S+ activity produced with such catalysts is indicative of a zeolite which is to a considerable degree hydrothermally stable. The activity of the catalyst after exposure of the calcined catalyst formulated from the zeolite to steam at 1550° F. for two hours will show an S+ activity in the range of about 40 to 50% for concentrations while not necessarily that of all such ultra stable catalysts, such values are characteristic of what have been termed A type catalysts (See the above Application) ranging from about 15 to 25% in the catalyst composition.

The techniques for carrying out such exchanges in the prior art have been described in the prior art (see Rabo "Zeolite Chemistry and Catalysis", page 309 and 310 published by the American Chemical Society in 1976 and see also U.S. Pat. Nos. 3,293,194, 3,402,996, 3,867,277, 3,281,199, 3,169,692 and 3,463,608). And such procedure has also been reported when using an X type zeolite (see Pat. No. 3,966,882). The literature in this art is extremely voluminous and this statement of the art is not intended to be exhaustive but for the purposes of placing the present invention in the historical perspective of this art (see our copending application Ser. No. 718,167 filed Mar. 30, 1977). Applicants in the aboveidentified application discovered an improved method of reducing the sodium content of the faujasite type zeolites. The zeolites thus formed have $Na_2O$ values of from about 2.5% to about 0.5% and catalysts formed from such zeolites employing the above matrixes have S+ activities in the range of about 50 to 60%. The preferred exchange cation was ammonium $NH_4$. Catalysts of the above type are also referred to as A type catalysts (see application, Ser. No. 782,971).

STATEMENT OF THE INVENTION

We have discovered that zeolites produced from an X type faujasite zeolite when exchanged with a rare earth cation in the form of a solution of a rare earth salt at a controlled pH in the range of about 5 to about 6 such as rare earth sulfate, chloride or nitrate at above the atmospheric boiling point, by exchange under superatmospheric pressure, the $Na_2O$ content of the zeolite is reduced to less than about 1% on a volatile-free basis. The catalysts produced using the X type zeolite according to the present invention have a hydrothermal stability as expressed by the S+ activity which is greatly superior to that of the B type catalysts. We prefer to carry out the exchange at superatmospheric pressures to a degree to reduce the $Na_2O$ content to substantially less than 0.8% and we have found that superior values of S+ activity is obtained when the resultant zeolite contains Na expressed as $Na_2O$ of less than about 0.5% of the zeolite on a volatile-free basis.

The temperature of the exchange may be from above about 250° F. up to about 400° F. and preferably about 300° F. to about 350° F. under autogenous superatmospheric pressure. The ratio of the rare earth to the zeolite in the exchange process is such as to provide one and preferably more than one equivalent of rare earth for one gram atom of aluminum in the zeolite charged to the process. We have found it desirable to control the pH of the reaction mixture past to the superatmospheric exchange zone before heating to be in the range of about 5 to about 6 and then heat the mixture in an autoclave to the above temperatures.

We have found that the most active catalysts are obtained when the rare earth exchange X zeolite contains an excess of the theoretical cation density of 1 equivalent rare earth oxide (ReO) per gram atom of aluminum in the exchange product and preferably when the rare earth cation density is itself of about 1 or more for example up to 2 equivalents per gram atom of aluminum in the exchanged zeolite. The X-ray spectrum of the exchange zeolite shows no rare earth compounds. While we do not wish to be bound by any theory, the observed facts are consistent with the view that the rare earth is associated with an exchange site. We have no explanation for this apparent departure from the conventional theory of the zeolite structure and the exchange process.

In our preferred embodiment, the exchange is carrier out employing rare earth salts in amounts substantially in excess of the equivalents of the sodium in the zeolite. The rare earth is mixed with zeolite at a pH in the range of about 5 to about 6 and thenheated under pressure to a temperature of about 300° F. to about 350° F. for a time sufficient to cause the exchange process to be carried out, that is, we have found about two to four hours is sufficient to produce the exchange zeolite with the required sodium and rare earth content. The following examples will illustrate our invention and are not to be taken as a limitation thereof.

EXAMPLE 1

The procedure in all of the following examples for the exchange of the zeolite, except as specified in the example was carried out as follows:

The X zeolite had the following anhydrous molar composition $Na_2O:Al_2O_3:2.5\ SiO_2$ and an $a_o$ of 24.9Å.

The rare earth sulfate expressed as the rare earth oxide (ReO) analyzed as follows:

| $La_2O_3$ | 57 weight percent |
| $CeO_2$ | 15 weight percent |
| $Nd_2O_3$ | 21 weight percent |
| $Pr_6O_{11}$ | 7 weight percent |

The equivalents of rare earth per 100 grams of the rare earth oxide, volatile free, are 1.896. 500 grams of the above sodium X containing 19.7% $Na_2O$ was dispersed at 3,000 milliliters of water. The dispersed zeolite was titrated to a pH of 8.0 with a 25% sulfuric acid solution. The slurry was filtered and washed. A rare earth sulfate solution was prepared by dissolving the above rare earth sulfate in water and diluted to 13,500 milliliters by dilution. The weight of the rare earth sulfate employed is sufficient to provide the amounts specified in each of the following examples. The zeolite filter cake produced as above was dispersed in the rare earth sulfate solution adding it at the rate to maintain the pH in the range of about 5 to 6 as specified in each of the following examples. The mixture was then introduced into the autoclave and heated to the temperature specified in each of the examples for the periods there specified. After the elapse of time the slurry was cooled, filtered and washed, sulfate free. It may be dried and it may be mixed with the matrix as described below, before or after drying.

EXAMPLE 2

The zeolite exchanged as described in Example 1 was incorporated into a matrix such as has been employed in the prior art commercial catalyst. The matrix was produced as follows:

A hundred grams of hydrated alumina, (pseudoboehmite) was peptized with 1.057 liters of water per hundred grams of alumina to which had been added 9.5 milliliters of 100% formic acid per 1.057 liters with moderate stirring for about thirty minutes. To this mixture was added 309.5 grams of ball clay per 100 grams of alumina on a volatile-free basis and 100 grams of acid-treated halloysite volatile-free basis, per 100 grams of alumina referred to above and the mixture was vigorously stirred for about fifteen minutes. To the resultant mixture was added the exchange zeolite produced as above in the proportions as specified in each of the examples with vigorous agitation. The mixture was spray dried to give particles of about 70 micron average diameter and containing about 15% volatile matter.

EXAMPLE 3

The autoclave charge was made up according to the procedure of Example 1. The ratio of the rare earth sulfate to the sodium zeolite on a volatile-free basis was 172.5 grams of rare earth oxides (ReO) to 500 grams of the zeolite. This is equivalent to a dosage of 34.5%, i.e., 34.5 grams of rare earth oxides to 100 grams of zeolite both volatile free. This is substantially 1 equivalent of ReO per equivalent of Na in the zeolite. The pH of the slurry prior to autoclaving was adjusted to 5.4 and the slurry was autoclaved at 300° F. for two hours.

The exchange zeolite on a volatile-free basis analyzed as follows:

| $Na_2O$ | 1.84% by weight |
| $ReO$ | 25.9 % by weight |
| $SiO_2$ | 44.3 % by weight |
| $Al_2O_3$ | 27.7 % by weight |

This is equivalent to 0.109 equivalent of Na per 1 gram atom of aluminum in the product and 0.809 equivalent of ReO per one gram of aluminum in the product. The zeolite was incorporated into the matrix according to the procedure of Example 2. The composition of the catalyst on a volatile-free basis was thus 19% of the zeolite, 18% of the alumina, 47% of ball clay and 16% of acid treated halloysite. The micro activity of the catalyst was as follows:

| M | S | S+ |
| --- | --- | --- |
| 49.6% | 30.8% | 18.7% |

EXAMPLE 4

The procedures of Example 1 and 2 were followed. The pH was held at 5.7 and the volume was 3.57 gallons. It was autoclaved for two (2) hours at a temperature ranging from 300° F. to 310° F.

The zeolite analyzed on a volatile-free basis is as follows:

| | | |
|---|---|---|
| Na$_2$O | 2.03% by weight | |
| ReO | 26.4 % by weight | |
| SiO$_2$ | 41.6 % by weight | |
| Al$_2$O$_3$ | 29.4 % by weight | |

This is equivalent to 0.12 equivalent of sodium per 1 gram atom of aluminum in the product and 0.87 equivalent of ReO per 1 gram atom of aluminum in the product. The exchange zeolite was incorporated in the matrix according to Example 2, except that the acid treated halloysite was replaced by an equal amount of silica-alumina gel and the micro activity of the catalyst was as follows:

| M | S | S+ |
|---|---|---|
| 76.2% | 57.8% | 29.2% |

EXAMPLE 5

The procedure of Example 4 was followed and the pH in this case was adjusted to 5.2. Duplicate samples of the exchanged zeolite analyzed as follows on a volatile-free basis averaged:

| | Sample 1 | Sample 2 |
|---|---|---|
| Na$_2$O = | 1.84% and 1.84% by weight | |
| ReO = | 25.9% and 26.3% by weight | |
| SiO$_2$ = | 44.3% and 44.2% by weight | |
| Al$_2$O$_3$ = | 27.7% and 27.5% by weight | |

The equivalent of sodium was 0.11 sodium per gram atom of aluminum in the product and that of the ReO was 0.90 per gram atom of aluminum in the product. The exchanged zeolite was incorporated in the matrix according with Example 2 and the micro activity of the catalyst was:

| M | S | S+ |
|---|---|---|
| 67.3% | 46.6% | 26.1% |

EXAMPLE 6

The procedure of Example 1 was followed but in this case the dosage was 45% of the rare earth oxide, i.e., 45 grams of the rare earth oxide volatile free per 100 grams of the sodium X volatile free. This is equivalent to about 1.3 equivalents of ReO per gram atom of Al in the sodium X. The attained pH was 5.3. The slurry was autoclaved for 4 hours at a temperature ranging from 337° F. to 343° F. The product on a volatile-free basis analyzed as follows:

Na$_2$O = 1.34% by weight
ReO = 27.6% by weight
SiO$_2$ = 41.6% by weight
Al$_2$O$_3$ = 28.78% by weight This is equivalent to 0.076 equivalent of sodium per gram atom of aluminum in the product and 0.924 equivalent of ReO per 1 gram atom of aluminum in the product. The zeolite was incorporated in the matrix according to Example 2 except that the nominal concentration of the zeolite was 20% with a proportionate reduction in the clay component. The micro activity of the catalyst was:

| M | S | S+ |
|---|---|---|
| 65.2% | 47.4% | 30.4% |

Another sample of the exchanged zeolite according to this example was incorporated in the matrix according to Example 2, but in this case the concentration of the zeolite was 25%. The micro activity of the catalyst was as follows:

| M | S | S+ |
|---|---|---|
| 68.5 | 39.9 | 27.4 |

EXAMPLE 7

The procedure of Example 2 was followed but the rare earth salt was cerium chloride (Ce Cl$_3$). The dosage was 45% as in Example 6 and the pH prior to autoclaving was 6.1 which is within the range of about 6. It was autoclaved for 4 hours at 338° F. The product analyzed on a volatile-free basis as follows:

Na$_2$O = 0.48% by weight
ReO (Ce$_2$O$_3$) = 30.2% by weight
SiO$_2$ = 39.9% by weight
Al$_2$O$_3$ = 30.2% by weight The equivalent of sodium per gram atom of aluminum in the product was 0.025 and for the cerium it was 0.93 per 1 gram atom of aluminum in the product. The zeolite was incorporated in the matrix according to Example 2 except that the concentration of the zeolite was 23% with a proportionate reduction in the clay component and the micro activity was:

| M | S | S+ |
|---|---|---|
| 69.9 | 46 | 29.7 |

EXAMPLE 8

The procedure of Example 7 was followed except that the salt was lanthanum chloride LaCl$_3$ The zeolite on a volatile-free basis analyzed as follows:

Na$_2$O = 0.48% by weight
ReO (La$_2$O$_3$) = 29.6% by weight
SiO$_2$ = 40.4% by weight
Al$_2$O$_3$ = 29.2% by weight The equivalents of sodium per gram atom of aluminum in the product was 0.026 and the equivalents of ReO per gram atom aluminum in the product was 0.92. The exchanged zeolite was incorporated in the matrix according to Example 7. The micro activity of the catalyst was:

| M | S | S+ |
|---|---|---|
| 68.8 | 63.5 | 33.5 |

EXAMPLE 9

The procedure of Example 1 was followed except that the dosage was 54%, i.e., 54 grams of rare earth oxide volatile free per 100 grams of sodium X volatile free. This is equivalent to about 1.6 equivalents of rare earth per gram atom of Al in the sodium X. The pH of the slurry prior to autoclaving was 6.1 and the slurry was autoclaved for four hours at 338° F. The zeolite analyzed as followed:

$Na_2O = 0.315\%$ by weight
$ReO = 33.5\%$ by weight
$SiO_2 = 37.\%$ by weight
$Al_2O_3 = 27.5\%$ by weight The equivalent of sodium per gram atom of aluminum in the product was 0.018 and the equivalent of ReO per gram atom aluminum in the product was 1.17. The zeolite was incorporated in the matrix according to Example 2 in the following proportions; the clay component being adjusted accordingly:

| Sample | a(1) | = | 19% on a volatile-free basis |
|--------|------|---|------------------------------|
|        | a(2) | = | 19% on a volatile-free basis |
|        | a(3) | = | 19% on a volatile-free basis |
| Sample | b(1) | = | 22% on a volatile-free basis |
|        | b(2) | = | 22% on a volatile-free basis |
|        | c(1) | = | 23% on a volatile-free basis |
|        | c(2) | = | 23% on a volatile-free basis |
|        | c(3) | = | 23% on a volatile-free basis |
|        | d(1) | = | 25% on a volatile-free basis |
|        | d(2) | = | 25% on a volatile-free basis |

Each of the catalysts was tested for micro activity with the following average results:

|        |      | M    | M    | S    | S+   |
|--------|------|------|------|------|------|
| Sample | a(1) |      | 69.2 | 62.8 | 32.4 |
|        | a(2) |      | 71.5 | 67.5 | 34.2 |
|        | a(3) |      | 73.7 | 67.5 | 38.5 |
|        | b(1) |      | 69.4 | 60.6 | 33.6 |
|        | b(2) |      | 70.2 | 64.8 | 33.3 |
|        | c(1) |      | 68.8 | 63.5 | 33.5 |
|        | c(2) |      | 69.9 | 51.4 | 29.7 |
|        | c(3) |      | 71.8 | 63.2 | 32.4 |
|        | d(1) |      | 65.9 | 69.2 | 30.4 |
|        | d(2) |      | 73.3 | 65.8 | 38.7 |
|        | Av   |      | 70.4 | 63.6 | 33.7 |

The following tables and graphs illustrate the discovery.

TABLE

| Example | Zeolite Composition Equivalents Per gram atom of Al | | Micro Activity | | |
|---------|------|------|------|------|------|
|         | Na   | ReO  | M %  | S %  | S+ % |
| 3       | 0.11 | 0.89 | 49.6 | 30.8 | 18.7 |
| 5       | 0.11 | 0.90 | 67.3 | 46.6 | 26.1 |
| 6       | 0.076| 0.924| 65.2 | 47.4 | 30.4 |
| 7       | 0.025| 0.93 | 69.9 | 46.  | 29.7 |
| 8       | 0.026| 0.92 | 68.8 | 63.5 | 33.5 |
| 9       | 0.018| 1.17 | 70   | 64   | 34   |

The data of Table 1 which tabulates all examples using the same clay matrix is plotted on FIG. 1 as will be seen by reference to Examples 7 and 8 and Example 6, the lanthanum ion acts similarly to the cerium ion and they both may be classed as ReO cations.

The data of Example 9 shows that within the limits of the experimental data the S+ activity of the exchanged zeolite is independent of concentration of the zeolite in the catalyst in the range of 19 to 25% and the average value of the micro activity for this example is given in Table 1.

It will also be observed that the sum of the equivalents of Na and ReO shows substantially no proton exchange. The S+ activity of the catalyst according to our invention is substantially higher than those of the Class B catalysts which are substantially deactivated when exposed to S+ conditions.

As will be observed from the Plot of FIG. 1 which plots the S+ activity of catalysts employing zeolites contaning various ratios of the equivalents of rare earth to one gram atom of aluminum in the zeolite product there is a dramatic increase in the S+ activity when the equivalents of ReO per gram of aluminum in the product exceeds about 0.9 equivalents of ReO per gram atom of aluminum in the product. The S+ activity rises to the range of about 30 to 35 percent as compared with range of about 20% for the Y type B catalysts which is in effect the S+ activity of the matrix itself.

We claim:

1. An X type faujasite zeolite having in excess of 0.9 equivalents of rare earth cations per gram atom of aluminum in the zeolite and less than 0.1 equivalents of Na per gram atom of aluminum in the zeolite, the cation density composed of Na and rare earth being substantially equal to one equivalent per gram atom of the aluminum in the exchanged zeolite.

2. The zeolite of claim 1 in which the cation density is in excess of 1 equivalent per gram atom of aluminum in the zeolite.

3. The zeolite of claim 2 in which the equivalents of Na is less than about 0.02 equivalents and the equivalents of rare earth is in excess of 1 per gram atom of aluminum.

4. A cracking catalyst comprising the exchanged zeolite of claim 1 and a matrix.

5. A cracking catalyst comprising the exchanged zeolite of claim 2 and a matrix.

6. A cracking catalyst comprising the exchanged zeolite of claim 3 and a matrix.

7. The process of exchanging a sodium X type zeolite which comprises forming a water slurry of rare earth salts and sodium X the ratio of the equivalents of rare earth cations per gram atom of aluminum in the zeolite being above about 1 and adjusting the pH of the mixture to be at a pH of about 5 to about 6 to form a reaction mixture and heated at a superatmospheric pressure and at a temperature of about 250° F. to 400° F. to introduce into the zeolite in excess of 0.9 equivalents of rare earth cation per gram atom of aluminum in the exchanged zeolite and washing the exchanged zeolite.

8. The process of claim 7 where the temperature is in the range of about 300° F. to about 350° F. and in which the equivalents of rare earth cation mixed with the sodium X is in excess of about 1.

9. The process of claim 8 in which the equivalents of rare earth cations per gram atom of Al in the sodium form is about 1 to about 2.

* * * * *